United States Patent
Lukac

(10) Patent No.: US 8,045,826 B2
(45) Date of Patent: Oct. 25, 2011

(54) DETECTING EDGES IN A DIGITAL IMAGES

(75) Inventor: Rastislav Lukac, Toronto (CA)

(73) Assignee: Seiko Epson Corporation, Tokyo (JP)

(*) Notice: Subject to any disclaimer, the term of this patent is extended or adjusted under 35 U.S.C. 154(b) by 776 days.

(21) Appl. No.: 12/167,949

(22) Filed: Jul. 3, 2008

(65) Prior Publication Data

US 2010/0002957 A1    Jan. 7, 2010

(51) Int. Cl.
 *G06K 9/32* (2006.01)
 *G06K 9/48* (2006.01)

(52) U.S. Cl. ......... 382/293; 382/167; 382/199; 382/275

(58) Field of Classification Search .............. 382/167, 382/199, 218, 275, 284, 293
See application file for complete search history.

(56) References Cited

U.S. PATENT DOCUMENTS

| | | | |
|---|---|---|---|
| 6,061,476 A | 5/2000 | Nichani | |
| 6,229,578 B1 | 5/2001 | Acharya et al. | |
| 6,466,255 B1 | 10/2002 | Kagita et al. | |
| 6,898,319 B1 | 5/2005 | Hazra et al. | |
| 6,978,050 B2 * | 12/2005 | Hunter et al. | 382/275 |
| 7,088,392 B2 | 8/2006 | Kakarala et al. | |
| 7,242,819 B2 | 7/2007 | Jiang | |
| 7,245,326 B2 | 7/2007 | Orlick | |
| 2003/0142750 A1 | 7/2003 | Oguz et al. | |
| 2004/0090443 A1 | 5/2004 | Wang | |
| 2005/0168644 A1 | 8/2005 | Demas et al. | |
| 2005/0207641 A1 | 9/2005 | Bala et al. | |

FOREIGN PATENT DOCUMENTS

| | | |
|---|---|---|
| JP | 2003123063 | 4/2003 |
| WO | 02056252 A2 | 7/2002 |

OTHER PUBLICATIONS

Color2Gray: Salience-Preserving Color Removal, Amy A. Gooch, Sven C. Olsen, Jack Tumblin, Bruce Gooch, Northwestern University, Jan. 2005, (pp. 1-6).

* cited by examiner

Primary Examiner — Daniel Mariam

(57) ABSTRACT

The image processing procedure of the invention receives mosaic image data and calculates a vertical-direction color difference component with regard to each of pixel columns in the mosaic image data in a vertical direction and a horizontal-direction color difference component with regard to each of pixel rows in the mosaic image data in a horizontal direction. The image processing procedure subsequently selects pixels from the mosaic image data, and compares the sign of the vertical color difference component of the target pixel to the signs of the vertical color difference components of the pixels above and below the target pixel, compare the sign of the horizontal color difference component of the target pixel to the signs of the horizontal color difference components of the pixels to the left and to the right of the target pixel, sets the corresponding edge map value of a corresponding edge map to 1 where the signs in one or more of the comparisons are not equal, and sets the corresponding edge map value of the corresponding edge map to 0 where the signs in all of the comparisons are equal.

21 Claims, 11 Drawing Sheets

FIG. 5

(a) Color Difference Component In Vertical Direction

G-Component Pixel $$\Delta^v_{(r,s)} = Z_{(r,s)} - (Z_{(r-1,s)} + Z_{(r+1,s)})/2$$

where $Z_{(r,s)}$ is the G Component and $(Z_{(r-1,s)} + Z_{(r+1,s)})/2$ is the R Component or B Component.

Non-G-Component Pixel $$\Delta^v_{(r,s)} = (Z_{(r-1,s)} + Z_{(r+1,s)})/2 - Z_{(r,s)}$$

where $(Z_{(r-1,s)} + Z_{(r+1,s)})/2$ is the G Component and $Z_{(r,s)}$ is the R Component or B Component.

(b) Color Difference Component In Horizontal Direction

G-Component Pixel $$\Delta^h_{(r,s)} = Z_{(r,s)} - (Z_{(r,s-1)} + Z_{(r,s+1)})/2$$

where $Z_{(r,s)}$ is the G Component and $(Z_{(r,s-1)} + Z_{(r,s+1)})/2$ is the R Component or B Component.

Non-G-Component Pixel $$\Delta^h_{(r,s)} = (Z_{(r,s-1)} + Z_{(r,s+1)})/2 - Z_{(r,s)}$$

where $(Z_{(r,s-1)} + Z_{(r,s+1)})/2$ is the G Component and $Z_{(r,s)}$ is the R Component or B Component.

FIG. 7
(a)
$$c_{(r,s)} = \begin{cases} 1 & \text{if } \{\text{sign}(\Delta^v_{(r,s)}) \neq \text{sign}(\Delta^v_{(r-1,s)}) \text{ or sign}(\Delta^v_{(r,s)}) \neq \text{sign}(\Delta^v_{(r+1,s)}) \\ & \text{or sign}(\Delta^h_{(r,s)}) \neq \text{sign}(\Delta^h_{(r,s-1)}) \text{ or sign}(\Delta^h_{(r,s)}) \neq \text{sign}(\Delta^h_{(r,s+1)}) \} \\ 0 & \text{otherwise} \end{cases}$$
(b) 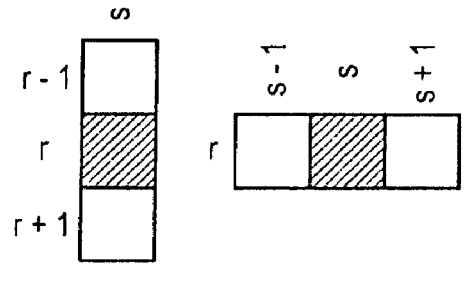
Edge Map
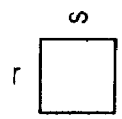

(a)
$$c_{(r,s)} = \begin{cases} 1 & \text{if } c_{(r,s)} = 0 \text{ and } \{(c_{(r-1,s-1)} + c_{(r-1,s+1)} + c_{(r+1,s-1)} + c_{(r+1,s+1)}) > 2 \\ & \text{or } (c_{(r-4,s)} + c_{(r,s-4)} + c_{(r,s+4)} + c_{(r+4,s)}) > 2 \} \\ 0 & \text{if } c_{(r,s)} = 1 \text{ and } (c_{(r-1,s-1)} + c_{(r-1,s+1)} + c_{(r+1,s-1)} + c_{(r+1,s+1)}) = 0 \\ c_{(r,s)} & \text{otherwise} \end{cases}$$

(a)
$$c_{(r,s)} = \begin{cases} 1 & \text{if } c_{(r,s)} = 0 \text{ and } \{(c_{(r-1,s-1)} + c_{(r-1,s+1)} + c_{(r+1,s-1)} + c_{(r+1,s+1)}) > 2 \\ & \text{or } (c_{(r-4,s)} + c_{(r,s-4)} + c_{(r,s+4)} + c_{(r+4,s)}) > 2 \} \\ c_{(r,s)} & \text{otherwise} \end{cases}$$

(b) Edge Map

DETECTING EDGES IN A DIGITAL IMAGES

BACKGROUND

1. Technical Field

Embodiments of the present invention relate to techniques of generating image data with an imaging device, such as a digital camera. More specifically embodiments of the invention pertain to techniques of detecting edges in a color filter array image having a mosaic arrangement of fine color filters of R (red), G (green), and B (blue) corresponding to three primary colors of light.

2. Related Art

With the advancement of digital techniques, images are generally processed as digital data (image data). Imaging devices such as digital cameras enable immediate output of captured images in the form of image data. The imaging device is typically equipped with an electronic image sensor consisting of small elements for converting the light intensities into electric signals. The imaging device focuses a captured image of a subject on the image sensor by means of an optical system and detects the light intensities in the individual elements as electric signals to generate image data. The light entering the optical system may be divided into three color components R, G, and B corresponding to three primary colors of light. The respective color lights of the three color components R, G, and B are directed to the image sensor, and the electric signals representing the light intensities of the respective color components acquired by the sensor are output to generate color image data.

The simplest method of acquiring the respective color lights of the three color components R, G, and B, which are obtained as divisions of the light entering the optical system, by the image sensor uses a spectroscopic prism to divide the incident light into the color lights of the three color components R, G, and B and focuses the respective color lights on image sensors to generate image data with regard to the respective color components R, G, and B. This method undesirably requires the three image sensors. One extensively used technique allocates one of the R, G, and B color components to each of the elements constituting the image sensor to attain detection of the respective color components R, G, and B by one image sensor. A typical configuration of this technique provides small color filters allowing transmission of only the R component in front of the elements assigned for detection of the R component, small color filters allowing transmission of only the G component in front of the elements assigned for detection of the G component, and small color filters allowing transmission of only the B component in front of the elements assigned for detection of the B component. This configuration enables simultaneous detection of the image data of the three color components R, G, and B by one image sensor. In the technique of detecting the respective color components R, G, and B by one image sensor, each element assigned for detection of a predetermined color component (for example, the R component) is unable to detect the other color components (for example, the G component and the B component). The resulting image data accordingly has a mosaic arrangement of pixels of the R component, pixels of the G component, and pixels of the B component. Interpolation of missing color components in each pixel with color components of adjacent pixels enables generation of color image data with the settings of all the color components R, G, and B in all the pixels.

An imaging device relying on three image sensors to convert the divisional color lights of the three color components R, G, and B into electric signals and generate image data of the respective color components R, G, and B is occasionally called a 'three image sensor' device. An imaging device that uses only one image sensor to generate image data of a mosaic arrangement and compute the missing color components by interpolation is occasionally called a 'single image sensor' device. The process of interpolating the missing color components in the image data of the mosaic arrangement to generate color image data with the settings of all the color components R, G, and B is sometimes referred to as a 'demosaicking process'.

A number of image processing operations such as demosaicking, spatial interpolation, and image denoising and enhancement rely on edge detection in order to direct processing operations along the edges present in the captured image data, thus avoiding processing errors. Edges are important features of digital images since they provide an indication of the shape of the objects in the image.

Typical edge detection processes involve comparing the gradients, square differences, or some other distance or (dis)similarity measures between two or more pixels with a predetermined or adaptive threshold(s). Such comparisons allow distinguishing between true edges and signal discontinuities due to data variations and noise present in the image. However, use of adaptive thresholds in typical edge detection processes can be computationally demanding whereas fixed thresholds may not allow accurate edge detection in images of complex scenarios with varying statistics.

SUMMARY

With the consumers' increasing demands for higher picture quality from imaging devices, development of efficient and accurate edge detection techniques for use in image processing operations such as demosaicking, resizing, denoising, and sharpening has been highly demanded.

In order to accomplish at least part of the demands mentioned above, one aspect of the invention is directed to an image processing apparatus that receives mosaic image data having settings of only one color component, among three color components R, G, and B corresponding to three primary colors of light, in each pixel and makes the received mosaic image data subject to a series of image processing to generate an edge map that identifies pixels of the mosaic image data through which an edge passes. The mosaic image data is expressed by a combination of pixel columns with alternate arrangement of pixels of the G component and pixels of the R component as another color component in a vertical direction, pixel columns with alternate arrangement of pixels of the G component and pixels of the B component as another color component in the vertical direction, pixel rows with alternate arrangement of pixels of the G component and pixels of the R component as another color component in a horizontal direction, and pixel rows with alternate arrangement of pixels of the G component and pixels of the B component as another color component in the horizontal direction.

The image processing apparatus includes two directional color difference computation modules and an edge detection module. A vertical-direction color difference component computation module is configured to obtain the G component in the pixel location of another color component or to obtain another color component in the G component pixel location using vertically neighboring available components in order to compute a vertical-direction color difference component between the G component and another color component in each pixel included in each of the pixel columns of the mosaic image. A horizontal-direction color difference component computation module is configured to obtain the G component in the pixel location of another color component or to obtain another color component in the G component pixel location using horizontally neighboring color components in order to compute a horizontal-direction color difference component between the G component and another color component in each pixel included in each of the pixel rows of the mosaic image.

An edge detection module is configured to select pixels from the mosaic image and in each such pixel location to compare the sign of the vertical color difference component of the target pixel to the signs of the vertical color difference components of the pixels above and below the target pixel. The edge detection module is also configured to compare the sign of the horizontal color difference component of the target pixel to the signs of the horizontal color difference components of the pixels to the left and to the right of the target pixel. The edge detection module is then configured to set the corresponding edge map value of the edge map to 1 where the signs in one or more of the comparisons are not equal, and set the corresponding edge map value of the edge map to 0 where the signs in all of the comparisons are equal.

Another aspect of the invention is an image processing method corresponding to the image processing apparatus of the above configuration. The image processing method receives mosaic image data having settings of only one color component, among three color components R, G, and B corresponding to three primary colors of light, in each pixel and makes the received mosaic image data subject to a series of image processing to generate an edge map that identifies pixels of the mosaic image data through which an edge passes.

The image processing method receives, as the mosaic image data, image data expressed by a combination of pixel columns with alternate arrangement of pixels of the G component and pixels of the R component as another color component in a vertical direction, pixel columns with alternate arrangement of pixels of the G component and pixels of the B component as another color component in the vertical direction, pixel rows with alternate arrangement of pixels of the G component and pixels of the R component as another color component in a horizontal direction, and pixel rows with alternate arrangement of pixels of the G component and pixels of the B component as another color component in the horizontal direction. The image processing method subsequently obtains the G component and another color component in each pixel included in each of the pixel columns of the mosaic image data by interpolation, and computes a vertical-direction color difference component between the G component and another color component in each pixel included in each of the pixel columns in the vertical direction. Similarly the image processing method obtains the G component and another color component in each pixel included in each of the pixel rows of the mosaic image data by interpolation, and computes a horizontal-direction color difference component between the G component and another color component in each pixel included in each of the pixel rows in the horizontal direction.

The image processing method then selects pixels from the mosaic image and in each such pixel location compares the sign of the vertical color difference component of the target pixel to the signs of the vertical color difference components of the pixels above and below the target pixel. The image processing method also compares the sign of the horizontal color difference component of the target pixel to the signs of the horizontal color difference components of the pixels to the left and to the right of the target pixel. The image processing method then sets the corresponding edge map value of the edge map to 1 where the signs in one or more of the comparisons are not equal, and sets the corresponding edge map value of the edge map to 0 where the signs in all of the comparisons are equal.

In another application of the invention, a computer reads a program for actualizing the image processing method described above to attain the respective functions. Another aspect of the invention is accordingly a program stored on a computer-readable medium that causes a computer to actualize a method of receiving mosaic image data having settings of only one color component, among three color components R, G, and B corresponding to three primary colors of light, in each pixel and making the received mosaic image data subject to a series of image processing to generate an edge map that identifies pixels of the mosaic image data through which an edge passes.

The program causes the computer to attain the functions of:

receiving, as the mosaic image data, image data expressed by a combination of pixel columns with alternate arrangement of pixels of the G component and pixels of the R component as another color component in a vertical direction, pixel columns with alternate arrangement of pixels of the G component and pixels of the B component as another color component in the vertical direction, pixel rows with alternate arrangement of pixels of the G component and pixels of the R component as another color component in a horizontal direction, and pixel rows with alternate arrangement of pixels of the G component and pixels of the B component as another color component in the horizontal direction;

obtaining the G component in the pixel location of another color component or obtaining another color component in the G component pixel location using vertically neighboring available components in order to compute a vertical-direction color difference component between the G component and another color component in each pixel included in each of the pixel columns of the mosaic image;

obtaining the G component in the pixel location of another color component or obtaining another color component in the G component pixel location using horizontally neighboring color components in order to compute a horizontal-direction color difference component between the G component and another color component in each pixel included in each of the pixel rows of the mosaic image; and selecting pixels from the mosaic image data, and in each such pixel location comparing the sign of the vertical color difference component of the target pixel to the signs of the vertical color difference components of the pixels above and below the target pixel, comparing the sign of the horizontal color difference component of the target pixel to the signs of the horizontal color difference components of the pixels to the left and to the right of the target pixel, setting the corresponding edge map value of the edge map to 1 where the signs in one or more of the comparisons are not equal, and setting the corresponding edge map value of the edge map to 0 where the signs in all of the comparisons are equal.

The computer reads the program according to this aspect of the invention to attain the respective functions described above and adequately generate an edge map that identifies pixels of the mosaic image data through which an edge passes.

BRIEF DESCRIPTION OF THE DRAWINGS

FIG. 5 shows calculation formulae for calculating color difference components from raw image data;

FIG. 7 shows creation of an edge map from data of color difference components;

BEST MODES OF CARRYING OUT THE INVENTION

Figure 1:
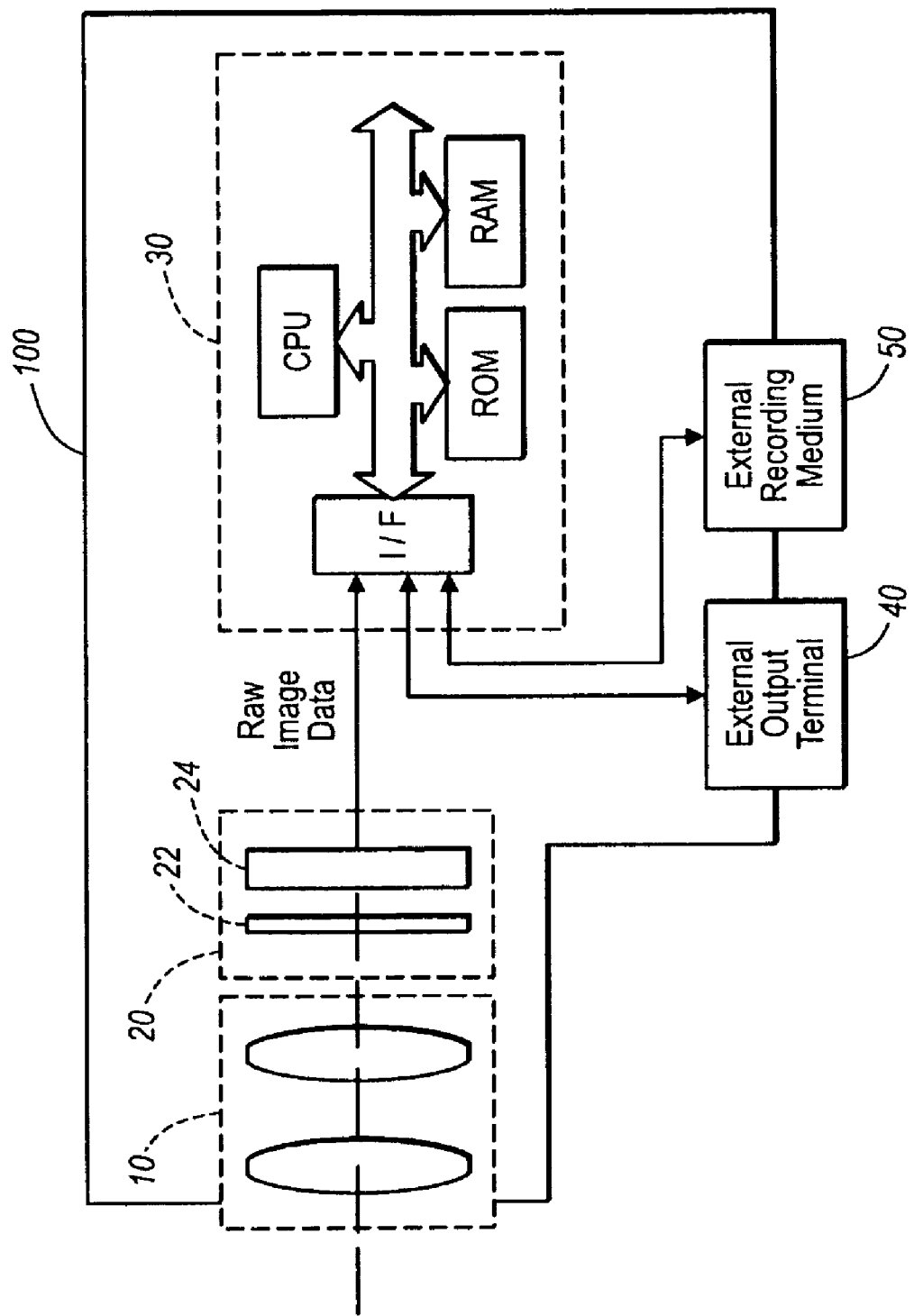
FIG. 1 schematically illustrates the configuration of a digital camera equipped with an image processing apparatus in one embodiment of the invention.

The invention may be understood more fully with reference to a preferred embodiment described below in the following sequence based on the accompanied drawings:

A. System Configuration
B. Outline of Edge Detection Process
C. Edge Map Creation Process
D. Edge Map Enhancement Process
E. Iterative Edge Map Enhancement Process A. System Configuration FIG. 1 schematically illustrates the configuration of a digital camera 100 equipped with an image processing apparatus 30 in one embodiment of the invention. As illustrated, the digital camera 100 includes an optical system 10 that has a group of multiple lenses, an imaging assembly 20 that converts an image of a subject formed by the optical system 10 into electric signals, and the image processing apparatus 30 that receives the electric signals from the imaging assembly 20 and makes the received electric signals subjected to a predetermined series of image processing to generate color image data.

The imaging assembly 20 has an image sensor 24 with a two-dimensional arrangement of multiple fine imaging elements for converting the light intensities into electric signals. A color filter array 22 is provided before the image sensor 24 and has a mosaic arrangement of fine color filters of R (red), G (green), and B (blue). The arrangement of the R, G, and B color filters constituting the color filter array 22 will be described later in detail. The R color filters, the G color filters, and the B color filters are constructed to allow transmission of R color light, transmission of G color light, and transmission of B color light, respectively. The image sensor 24 captures image data having a mosaic arrangement of image parts responsive to the R light intensities, image parts responsive to the G light intensities, and image parts responsive to the B light intensities according to the mosaic arrangement of the R, G, and B color filters in the color filter array 22.

The image processing apparatus 30 mounted on the digital camera 100 receives the image data of the mosaic arrangement from the imaging assembly 20 and generates color image data with settings of the R component, the G component, and the B component in the respective pixels. In the image processing apparatus 30 of the embodiment, a CPU, a ROM, a RAM, and a data input/output interface (I/F) are interconnected via a bus to enable mutual data transmission. The CPU performs a series of processing operations to generate the color image data according to a program stored in the ROM. The resulting color image data thus generated may be output to an external device via an external output terminal 40 or may be output to an external recording medium 50.

The image data with the mosaic arrangement of the R, G, and B components captured by the image sensor 24 is used as source data, which is referred to by the image processing apparatus 30 to generate the color image data with the settings of the R, G, and B components in the respective pixels. The image data of the mosaic arrangement captured by the image sensor 24 may thus be hereafter referred to as 'raw image data'.

Figure 2:
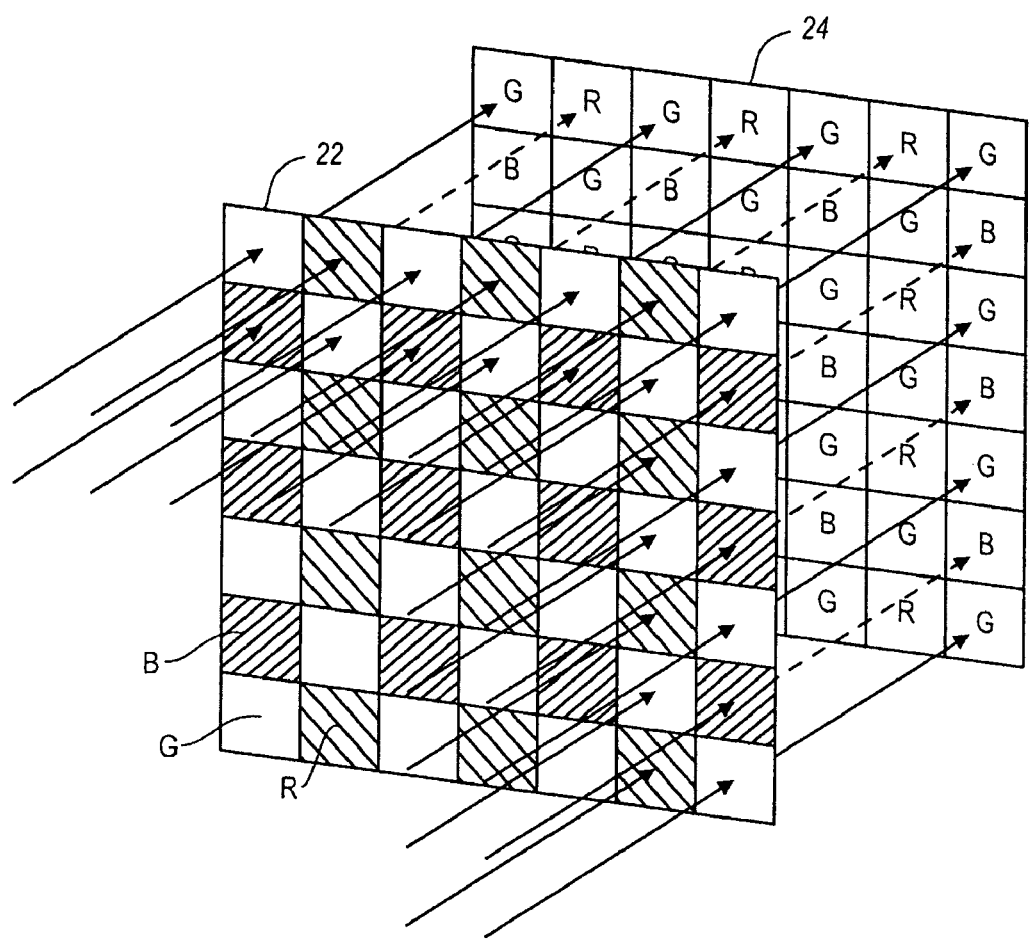
FIG. 2 is a conceptual view showing the structure of a color filter array and an image sensor included in the image processing apparatus of FIG. 1.

FIG. 2 is a conceptual view showing the structure of the color filter array 22 and the image sensor 24. As mentioned above, the image sensor 24 has the two-dimensional arrangement of fine imaging elements that output electric signals corresponding to the light intensities. In the illustrated example of FIG. 2, the fine imaging elements are arranged in a lattice pattern. Each of the small rectangles in the lattice pattern of the image sensor 24 conceptually represents one imaging element.

The color filter array 22 has one of the R color filter, the G color filter, and the B color filter set corresponding to the position of each of the multiple imaging elements constituting the image sensor 24. In FIG. 2, the sparsely hatched rectangles, the densely hatched rectangles, and the non-hatched open rectangles respectively denote the R color filters, the B color filters, and the G color filters. In the arrangement of the R, G, and B color filters, the G color filters are positioned first to be diagonal to one another and form a checkerboard pattern. Namely the G color filters occupy half the area of the color filter array 22. The same numbers of the R color filters and the B color filters are then evenly arranged in the remaining half area of the color filter array 22. The resulting color filter array 22 of this arrangement shown in FIG. 2 is called the Bayer color filter array.

As mentioned above, the G color filters, the R color filters, and the B color filters are designed to allow transmission of only the G color light, transmission of only the R color light, and transmission of only the B color light, respectively. The image sensor 24 accordingly captures the image data of the mosaic arrangement by the function of the Bayer color filter array 22 located before the image sensor 24 as shown in FIG. 2. The image data of the mosaic arrangement is not processable in the same manner as ordinary image data and cannot directly express an image. The image processing apparatus 30 receives the image data of the mosaic arrangement (raw image data) and generates ordinary color image data having the settings of the R, G, and B components in the respective pixels.

B. Outline of Edge Detection Process

Figure 3:
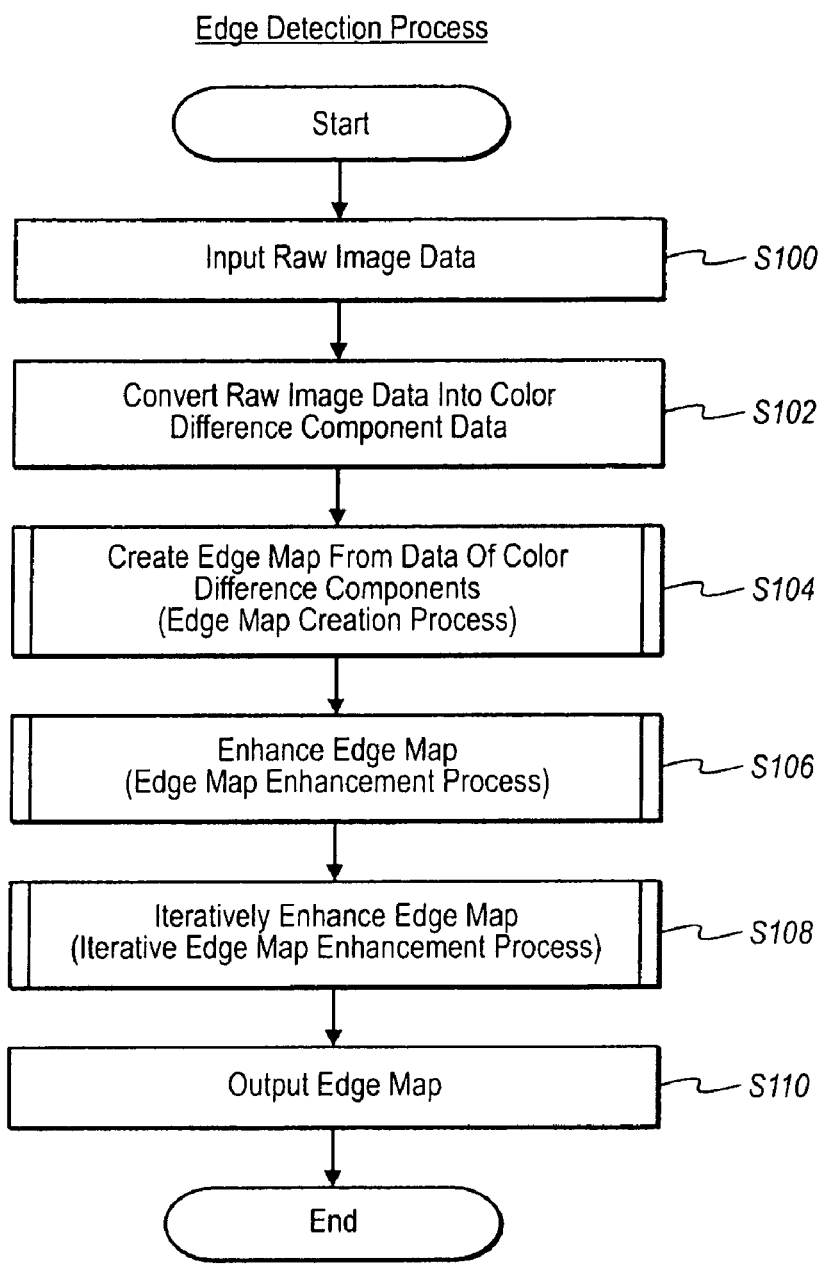
FIG. 3 is a flowchart showing an edge detection process, which is executed by the image processing apparatus of the embodiment to generate and enhance an edge map from raw image data.

FIG. 3 is a flowchart showing an edge detection process, which is executed by the image processing apparatus 30 of the embodiment to generate and enhance an edge map from the raw image data. In the structure of this embodiment, the CPU included in the image processing apparatus 30 executes this edge map generation and enhancement by the software configuration, which may be embodied as a program stored on a computer-readable medium. This is, however, not essential, but a specific hardware element, for example, a signal processor, may be used for the same purpose.

As discussed in detail later, the proposed edge detection operates on color difference signals generated from the mosaic raw image data. Since color differences are commonly used in demosaicking, which is an integral step in single-sensor camera image processing, this characteristic enables the edge detection process disclosed herein to be performed efficiently with the minimum additional computational resources compared to demosaicking. Thus, the edge detection process disclosed herein is rather simple and is executable at high speed. In addition, since demosaicking using color-differences usually produces significant errors in areas with varying polarities of color difference signals, performing edge detection as disclosed herein can greatly improve the processing accuracy of the demosaicking process. This distinguishes edge detection process disclosed herein from common edge-detection solutions.

On the start of the edge detection process, the CPU first receives raw image data as source data from the image sensor 24 (step S100) and converts the received raw image data into data of color difference components (step S102) as described below in detail.

Figure 4:
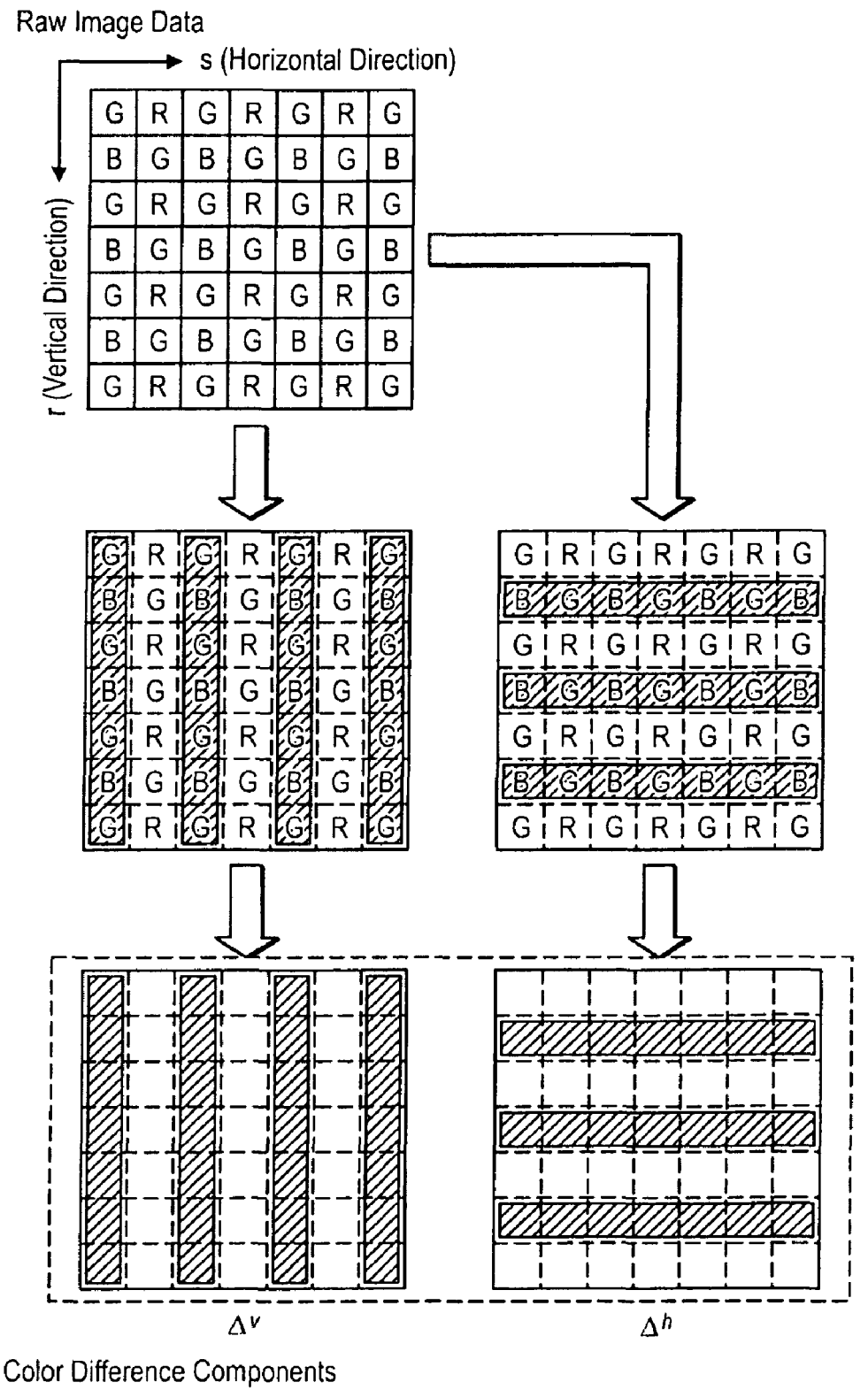
FIG. 4 conceptually shows a process of converting raw image data into data of color difference components.

FIG. 4 conceptually shows a process of converting raw image data into data of color difference components. The top of FIG. 4 shows a conceptual view of the raw image data read from the image sensor 24. The raw image data obtained with the Bayer color filter array has the mosaic arrangement of the R, G, and B components. In a horizontal direction, there are only two types of pixel rows in the raw image data: pixel rows having alternately arranged G pixels (pixels with G component) and R pixels (pixels with R component) and pixel rows having alternately arranged G pixels and B pixels (pixels with B component). In a vertical direction, there are similarly only two types of pixel columns in the raw image data: pixel columns having alternately arranged G pixels and R pixels and pixel columns having alternately arranged G pixels and B pixels. The middle of FIG. 4 conceptually shows that the raw image data consists of only the pixel rows of alternate G pixels and R pixels and the pixel rows of alternate G pixels and B pixels in the horizontal direction while consisting of only the pixel columns of alternate G pixels and R pixels and the pixel columns of alternate G pixels and B pixels in the vertical direction.

Based on this result of observation, the edge detection process of this embodiment converts the raw image data of the R, G, and B components into data representing differences of color components of the pixel rows in the horizontal direction (color difference components in the horizontal direction) and data representing differences of color components of the pixel columns in the vertical direction (color difference components in the vertical direction). For example, the raw image data is converted into data on color difference components between G and R components with regard to the pixel rows or the pixel columns of alternate G pixels and R pixels. Similarly the raw image data is converted into data on color difference components between G and B components with regard to the pixel rows or the pixel columns of alternate G pixels and B pixels. Calculation formulae for calculating the color difference components will be described in detail later.

The bottom of FIG. 4 conceptually shows the color difference components in the horizontal direction and in the vertical direction thus obtained. A left-side view on the bottom shows color difference components $\Delta_{(r,s)}^v$ obtained by processing the raw image data in the vertical direction. As shown in the middle, each of hatched pixel columns is a pixel column of alternate G pixels and B pixels. Each color difference component $\Delta_{(r,s)}^v$ on this pixel column thus accordingly represents a color difference component between the G component and the B component. Each of remaining non-hatched pixel columns is a pixel column of alternate G pixels and R pixels. Each color difference component $\Delta_{(r,s)}^v$ on this pixel column thus accordingly represents a color difference component between the G component and the R component. The raw image data in the horizontal direction is similarly processable. Each of hatched pixel rows gives color difference components $\Delta_{(r,s)}^h$ between the G pixels and the B pixels. Each of the remaining non-hatched pixel rows gives color difference components $\Delta_{(r,s)}^h$ between the G pixels and the R pixels.

FIG. 5 shows calculation formulae for calculating the color difference components from the raw image data. FIG. 5(a) shows calculation formulae for calculating the color difference components $\Delta_{(r,s)}^v$ in the vertical direction, and FIG. 5(b) shows calculation formulae for calculating the color difference components $\Delta_{(r,s)}^h$ in the horizontal direction. In these calculation formulae, 'z' denotes values of the raw image data obtained by the image sensor 24, and $z_{(r,s)}$ shows a value at a specific position defined by an r-th pixel position downward from the position of the original set in an image and an s-th pixel position rightward from the position of the original (see the top of FIG. 4).

Referring to FIG. 5(a), the description relates to the calculation formulae for calculating the color difference components $\Delta_{(r,s)}^v$ in the vertical direction. When a target pixel as an object of computation of the color difference component $\Delta_{(r,s)}^v$ is a pixel with the G component (G pixel), the upper calculation formula of FIG. 5(a) is adopted. The process first calculates an average of values of pixels above and below the target pixel (that is, a second term surrounded by the one-dot chain line) and subtracts the calculated average from the G component of the target pixel (that is, a first term surrounded by the broken line) to calculate a color difference component $\Delta_{(r,s)}^v$ of the target pixel in the vertical direction. Since the target pixel for computation of the color difference component $\Delta_{(r,s)}^v$ is the G pixel, the tone value $z_{(r,s)}$ of the target pixel naturally represents the G component. The element $z_{(r-1,s)}$ in the second term shows a tone value of the raw image data in the upper pixel above the target pixel, whereas the element $z_{(r+1,s)}$ in the second term shows a tone value of the raw image data in the lower pixel below the target pixel. As explained above with reference to FIG. 4, the upper and the lower pixels above and below the target G pixel may be R pixels or B pixels but are always pixels of an identical color component. The second term surrounded by the one-dot chain line in the upper calculation formula in FIG. 5(a) accordingly represents either the R component or the B component calculated from the values of the upper and the lower pixels (that is, either the R pixels or the B pixels). Application of the upper calculation formula in FIG. 5(a) determines the color difference component $\Delta_{(r,s)}^v$ in the vertical direction with regard to the pixel with the G component (G pixel), irrespective of the upper and the lower pixels as the R pixels or the B pixels.

It should be noted that application of the identical calculation formula to the R pixels and the B pixels as the upper and the lower pixels gives two different types of the color difference components $\Delta_{(r,s)}^v$. When the upper and the lower pixels are the R pixels, the resulting color difference component $\Delta_{(r,s)}^v$ in the vertical direction represents the color difference component between the G component and the R component. When the upper and the lower pixels are the B pixels, on the other hand, the resulting color difference component $\Delta_{(r,s)}^v$ in the vertical direction represents the color difference component between the G component and the B component.

The color difference components $\Delta_{(r,s)}^v$ in the vertical direction are similarly computable with regard to pixels other than the G pixels (that is, R pixels and B pixels). For example, when a target pixel as the object of computation of the color difference component $\Delta_{(r,s)}^v$ is an R pixel, pixels above and below the target pixel are G pixels as explained above with reference to FIG. 4. The average of the values of the upper and the lower pixels is believed to specify the G component in the target pixel as the object of computation of the color difference component $\Delta_{(r,s)}^v$. Subtraction of the tone value of the target pixel (in this case, the R component) from the specified G component determines the color difference component $\Delta_{(r,s)}^v$. Each B pixel set as the target pixel is subjected to the same series of processing. With regard to the pixels other than the G pixels, as shown in the lower calculation formula of FIG. 5(a), subtraction of a second term (non-G component pixel) surrounded by the one-dot chain line from a first term (estimated G-component pixel) surrounded by the broken line on the right side gives the color difference component $\Delta_{(r,s)}^v$ in the vertical direction.

The identical calculation formula is applicable to computation of the color difference components $\Delta_{(r,s)}^v$ in the vertical direction, with regard to both the R pixel and the B pixel set as the target pixel other than the G pixel. It should, however, be noted that the R pixel and the B pixel processed as the target pixel give two different types of the color difference components $\Delta_{(r,s)}^v$. When the target pixel is the R pixel, the resulting color difference component $\Delta_{(r,s)}^v$ represents the color difference component between the G component and the R component. When the target pixel is the B pixel, on the other hand, the resulting color difference component $\Delta_{(r,s)}^v$ represents the color difference component between the G component and the B component.

The edge detection process of the embodiment applies the completely identical calculation formulae for the advanced processing with the two different types of the color difference components $\Delta_{(r,s)}^v$. Application of the identical calculation formulae desirably attains the simplicity and the high speed of the advanced processing with the two different types of the color difference components $\Delta_{(r,s)}^v$, which are comparable to the conventional simple processing. Unlike the conventional simple processing, however, this advanced processing of the embodiment enables adequate demosaicking with prevention of the occurrence of pseudo colors.

The color difference components $\Delta_{(r,s)}^h$ in the horizontal direction are computable in the same manner as the color difference components $\Delta_{(r,s)}^v$ in the vertical direction explained above. The computation of the color difference components $\Delta_{(r,s)}^h$ is explained briefly with reference to FIG. 5(b). As shown in the upper calculation formula of FIG. 5(b), subtraction of a second term surrounded by the one-dot chain line from a first term surrounded by the broken line on the right side gives the color difference component $\Delta_{(r,s)}^h$ of the G pixel in the horizontal direction. In the calculation formula, the element $z_{(r,s)}$ represents a tone value (that is, the G component) of the raw image data in a target pixel as the object of computation of the color difference component. The element $z_{(r,s-1)}$ shows a tone value of the raw image data in a pixel on the left of the target pixel, whereas the element $z_{(r,s+1)}$ shows a tone value of the raw image data in a pixel on the right of the target pixel. These pixels on the left and the right of the target G pixel may be R pixels or B pixels but are always pixels of an identical color component.

In computation of the color difference component $\Delta_{(r,s)}^h$ in the horizontal direction with regard to a target pixel other than the G pixel (that is, with regard to either an R target pixel or a B target pixel), the pixels on the left and the right of the R or B target pixel are the G pixels. As shown in the lower calculation formula of FIG. 5(b), subtraction of a second term surrounded by the one-dot chain line (a tone value of the target pixel) from a first term surrounded by the broken line (an average of values of the left and the right pixels) gives the color difference component $\Delta_{(r,s)}^h$ in the horizontal direction.

The identical calculation formulae are applicable to computation of the color difference components $\Delta_{(r,s)}^h$ in the horizontal direction, with regard to the target G pixel having the R pixels or the B pixels as the left and the right pixels and with regard to both the R pixel and the B pixel set as the target pixel other than the G pixel. The computation, however, gives two different types of the color difference components $\Delta_{(r,s)}^h$, that is, the color difference component between the G component and the R component and the color difference component between the G component and the B component. Application of the completely identical calculation formulae desirably attains the simplicity and the high speed of the advanced processing with the two different types of the color difference components $\Delta_{(r,s)}^h$ in the horizontal direction, which are comparable to the conventional simple processing.

As clearly understood from the comparison between FIGS. 5(a) and 5(b), the calculation formulae used for computation of the color difference components $\Delta_{(r,s)}^v$ in the vertical direction are significantly similar to the calculation formulae used for computation of the color difference components $\Delta_{(r,s)}^h$ in the horizontal direction. Namely the processing flow can be standardized for computation of both the color difference components $\Delta_{(r,s)}^v$ and $\Delta_{(r,s)}^h$ in the two different directions. This further enhances the simplicity and the high speed of the overall processing.

At step S102 in the flowchart of FIG. 3, the raw image data captured by the image sensor 24 is converted into the color difference components $\Delta_{(r,s)}^v$ in the vertical direction and the color difference components $\Delta_{(r,s)}^h$ in the horizontal direction.

Referring back to the flowchart of FIG. 3, after computation of the color difference components $\Delta_{(r,s)}^v$ in the vertical direction and the color difference components $\Delta_{(r,s)}^h$ in the horizontal direction in the above manner, the edge detection process of the embodiment creates an edge map with these data on the color difference components (edge map creation process) (step S104). The edge map shows each edge detected in the image with the value $c_{(r,s)}=1$ indicating the presence of the edge in the (r,s) pixel location and with the value $c_{(r,s)}=0$ indicating no edge in the (r,s) pixel location. For the purpose of demosaicking or other image processing on raw data, such as resizing, denoising, or sharpening, the edge map may not be necessarily set for all the pixels but should be set at least for the non-G pixels (that is, the R pixels and the B pixels) or the G pixels. The edge detection process of the embodiment detects the edges based on the color difference components $\Delta_{(r,s)}^v$ in the vertical direction and the color difference components $\Delta_{(r,s)}^h$ in the horizontal direction as described later. This ensures the accurate and relatively high-speed detection of the edges. The details of the edge map creation process will be described below.

After creation of the edge orientation map, the CPU subsequently enhances the edge map (edge map enhancement process) (step S106). The CPU subsequently iteratively enhances the edge map (iterative edge map enhancement process) (step S108). The details of the optional edge map enhancement process and the optional iterative edge map enhancement process will be described below.

On completion of the edge map creation process (step S104), and optionally of the edge map enhancement process and the iterative edge map enhancement process (steps S106 and S108), the CPU subsequently outputs the edge map (step S110) and terminates the edge detection process of FIG. 3.

As described above, the edge detection process of this embodiment detects the edges based on the color difference components $\Delta_{(r,s)}^v$ in the vertical direction and the color difference components $\Delta_{(r,s)}^h$ in the horizontal direction to create the edge map. More specifically the edges are detected according to the two different types (the color difference component between the G component and the R component and the color difference component between the G component and the B component) of the color difference components $\Delta_{(r,s)}^v$ in the vertical direction and the color difference components $\Delta_{(r,s)}^h$ in the horizontal direction. Since color differences are commonly used in demosaicking, which is an integral step in single-sensor camera image processing, this characteristic enables creation of the edge map efficiently with the minimum additional computational resources compared to demosaicking. Thus, the edge map creation process is rather simple and is executable at the high speed. In addition, since demosaicking using color-differences usually produces significant errors in areas with varying polarities of color difference signals, performing edge detection as described in this disclosure can greatly improve the processing accuracy of the demosaicking process. This distinguishes the described method from common edge-detection solutions. The following description sequentially regards the details of the edge map creation process, the edge map enhancement process, and the iterative edge map enhancement process.

C. Edge Map Creation Process

Figure 6:
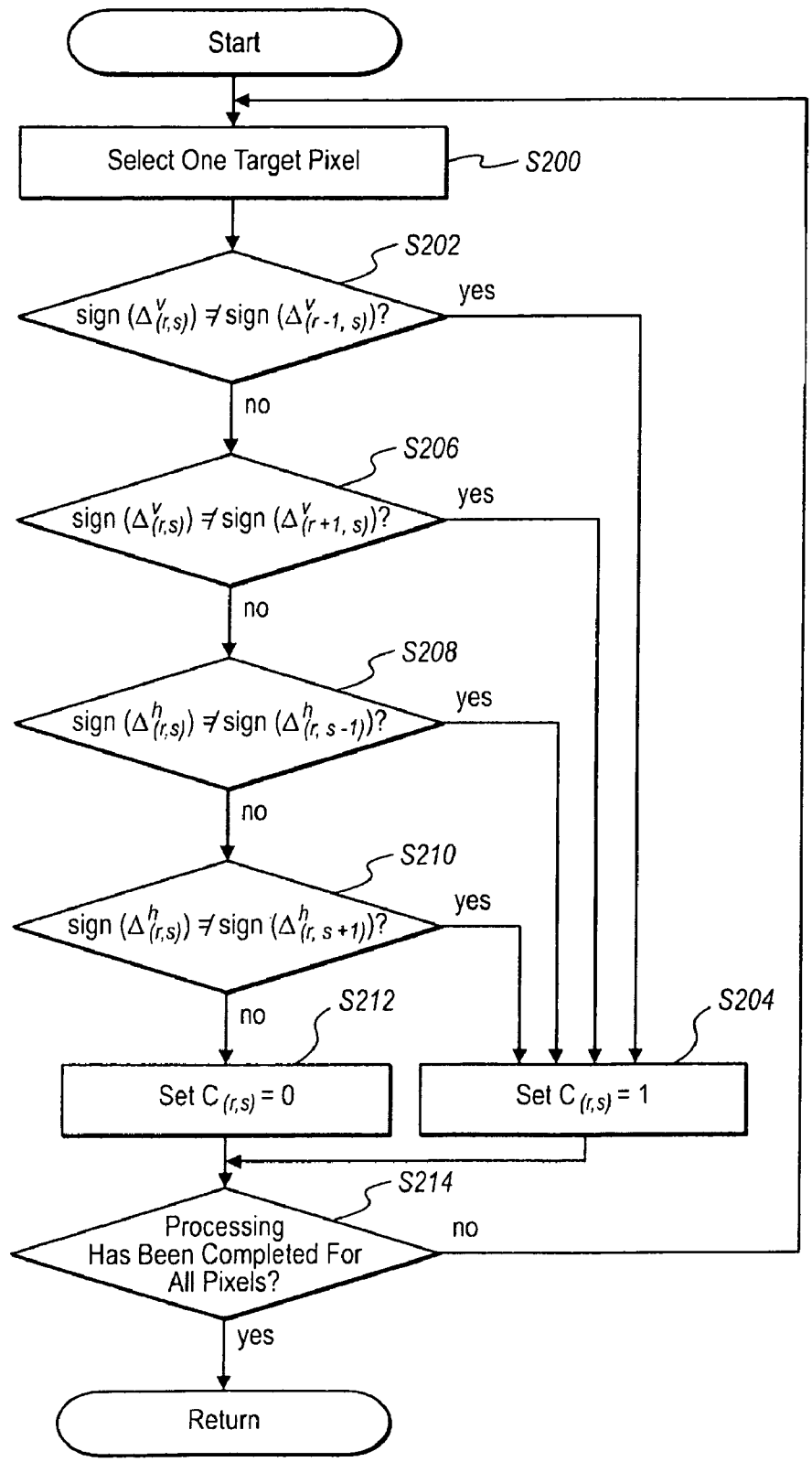
FIG. 6 is a flowchart showing the details of an edge map creation process executed in the edge detection process of FIG. 3 by the image processing apparatus of the embodiment.

FIG. 6 is a flowchart showing the details of the edge map creation process executed at step S104 in the color image data generation process of FIG. 3 by the image processing apparatus 30 of the embodiment.

It should be clear that $\Delta_{(r,s)}^v$ and $\Delta_{(r,s)}^h$ can have both positive and negative values. Extensive experimentation has shown that the polarity of both the color difference components $\Delta_{(r,s)}^v$ and $\Delta_{(r,s)}^h$ usually changes in the edge areas. Therefore, instead of calculating various distances on the color difference components $\Delta_{(r,s)}^v$ and $\Delta_{(r,s)}^h$ and comparing these distances with the threshold(s), the edge map creation process detects edges by localizing inconsistencies in the polarity of the color difference components $\Delta_{(r,s)}^v$ and $\Delta_{(r,s)}^h$.

The edge map creation process first selects one target pixel as an object of detection of the edge (step S200). After selecting one target pixel, the edge map creation process next determines whether the target pixel's vertical color difference component has a different sign than the vertical color difference component of the pixel above the target pixel (step S202). When the target pixel's vertical color difference component does have a different sign than the vertical color difference component of the pixel above the target pixel (step S202: yes), it is determined that an edge goes through the target pixel. A value representing the edge characteristic of the target pixel is then set equal to '1' (step S204).

When the target pixel's vertical color difference component does not have a different sign than the vertical color difference component of the pixel above the target pixel (step S202: no), the edge map creation process next determines whether the target pixel's vertical color difference component has a different sign than the vertical color difference component of the pixel below the target pixel (step S206). When the target pixel's vertical color difference component does have a different sign than the vertical color difference component of the pixel below the target pixel (step S206: yes), it is determined that an edge goes through the target pixel and the value representing the edge characteristic of the target pixel is then set equal to '1' (step S204).

When the target pixel's vertical color difference component does not have a different sign than the vertical color difference component of the pixel below the target pixel (step S206: no), the edge map creation process next determines whether the target pixel's horizontal color difference component has a different sign than the horizontal color difference component of the pixel to the left of the target pixel (step S208). When the target pixel's horizontal color difference component does have a different sign than the horizontal color difference component of the pixel to the left of the target pixel (step S208: yes), it is determined that an edge goes through the target pixel and the value representing the edge characteristic of the target pixel is then set equal to '1' (step S204).

When the target pixel's horizontal color difference component does not have a different sign than the horizontal color difference component of the pixel to the left of the target pixel (step S208: no), the edge map creation process next determines whether the target pixel's horizontal color difference component has a different sign than the horizontal color difference component of the pixel to the right of the target pixel (step S210). When the target pixel's horizontal color difference component does have a different sign than the horizontal color difference component of the pixel to the right of the target pixel (step S210: yes), it is determined that an edge goes through the target pixel and the value representing the edge characteristic of the target pixel is then set equal to '1' (step S204).

When the target pixel's horizontal color difference component does not have a different sign than the horizontal color difference component of the pixel to the right of the target pixel (step S210: no), it is determined that no edge goes through the target pixel and the value representing the edge characteristic of the target pixel is then set equal to '0' (step S212).

After the value representing the edge characteristic of the target pixel is set equal to either 1 at step S204 or 0 at step S212, the CPU determines whether the edges have been detected with regard to all the pixels (step S214). When there is any unprocessed pixel (step S214: no), the edge map creation process returns to step S200 to select another target pixel among unprocessed pixels and executes the subsequent series of processing. On completion of detection of the edges orientations with regard to all the pixels (step S214: yes), the edge map creation process of FIG. 6 is terminated.

FIG. 7 shows creating the edge map from data of color difference components. In particular, FIG. 7(a) shows a calculation formula, and FIG. 7(b) conceptually shows creating the edge map according to the calculation formula of FIG. 7(a). A shaded rectangle in FIG. 7(b) represents the position of a target pixel $z_{(r,s)}$. The edge map creation process first compares the sign of the vertical color difference component $\Delta_{(r,s)}^v$ of the target pixel $z_{(r,s)}$ to the signs of the vertical color difference components $\Delta_{(r-1,s)}$ and $\Delta_{(r+1,s)}$ of the pixels $z_{(r-1,s)}$ and $z_{(r+1,s)}$ above and below the target pixel. Similarly the computation process compares the sign of the horizontal color difference component $\Delta_{(r,s)}^h$ of the target pixel $z^{(r,s)}$ to the signs of the horizontal color difference components $\Delta_{(r,s-1)}^h$ and $\Delta_{(r,s+1)}^h$ of the pixels $z_{(r,s-1)}$ and $z_{(r,s+1)}$ to the left and right of the target pixel. The notation sign($\Delta$) denotes the sign or polarity of the entry $\Delta$. The term $c_{(r,s)}$ is the value in a binary edge map c with the same spatial resolution (dimensions) as the raw image; with the value $c_{(r,s)}=1$ indicating the presence of an edge in the (r,s) pixel location and with the value $c_{(r,s)}=0$ indicating the absence of an edge in the (r,s) pixel location.

D. Edge Map Enhancement Process

Figure 8:
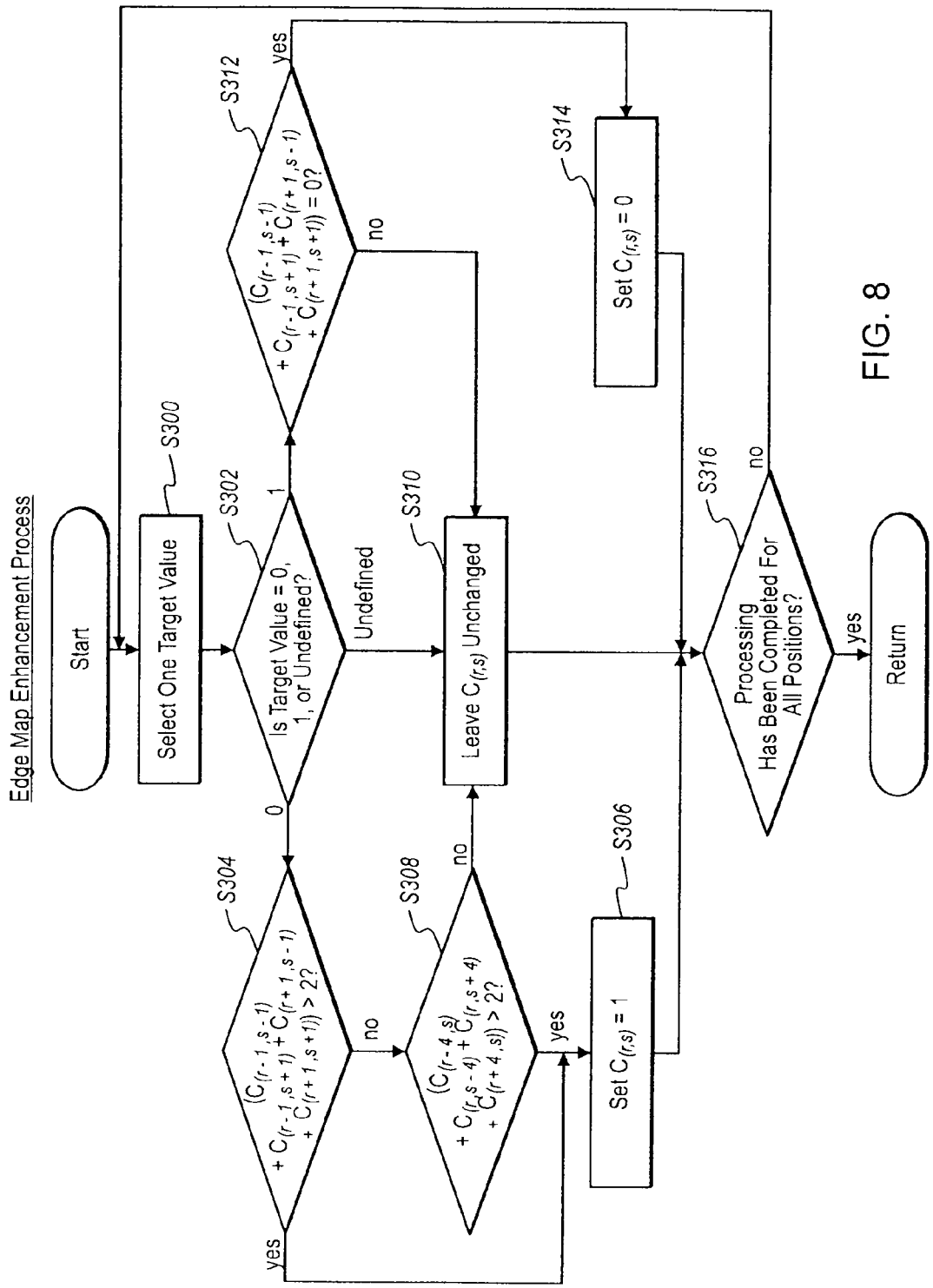
FIG. 8 is a flowchart showing the details of an edge map enhancement process executed in the edge detection process of FIG. 3 by the image processing apparatus of the embodiment.

FIG. 8 is a flowchart showing the details of the edge map enhancement process executed at step S106 in the edge detection process of FIG. 3 by the image processing apparatus 30 of the embodiment.

The edge map enhancement process first selects one target binary value of the edge map as an object of enhancement (step S300). After selecting one target binary value, the edge map enhancement process next determines whether the target value is equal to 0, 1, or undefined (step S302).

When the target binary value is equal to 0 (step S302: 0), it is next determined whether the sum of the four binary values (namely $c_{(r-1,s-1)}$, $c_{(r-1,s+1)}$, $c_{(r+1,s-1)}$, and $c_{(r+1,s+1)}$) at each corner of the target binary value is greater than 2 (step S304). When the sum of the four binary values at each corner of the target binary value is greater than 2 (step S304: yes), the target binary value is set to 1 (step S306).

When the sum of the binary values at each corner of the target binary value is not greater than 2 (step S304: no), it is next determined whether the sum of the four binary values of pixels above, below, to the left of, and to the right of the target binary value is greater than 2 (step S308). When the sum of the binary values of these four pixels is greater than 2 (step S308: yes), the target binary value is set to 1 (step S306). Otherwise (step S308: no), the target binary value is left unchanged (step S310). It should be noted that in order to increase the performance of such enhancement of the edge map, the four horizontally and vertically located pixels used in the present embodiment may be $c_{(r-4,s)}$, $c_{(r,s-4)}$, $c_{(r,s+4)}$, and $c_{(r+4,s)}$, although other horizontally and vertically located pixels may alternatively be used.

When the target binary value is equal to 1 (step S302: 1), it is next determined whether the sum of the four binary values at each corner of the target binary value is equal to 0 (step S312). When the sum of these four binary values is equal to 0 (step S312: yes), the target binary value is set to 0 (step S314). When the sum of the binary values at each corner of the target binary value is not equal to 0 (step S312: no), the target binary value is left unchanged (step S310).

When the target binary value is undefined (step S302: undefined), the target binary value is left unchanged (step S310).

After the value representing the edge characteristic of the target value is set equal to either 1 at step S306, set equal to 0 at step S314, or left unchanged at S310, the CPU determines whether the edge map has been enhanced with regard to all the map's pixel locations (step S316). When there is any unprocessed value (step S316: no), the edge map enhancement process returns to step S300 to select another target value among unprocessed values and executes the subsequent series of processing. On completion of enhancement of the edge map with regard to all the values (step S316: yes), the edge map enhancement process of FIG. 8 is terminated.

Figure 9:
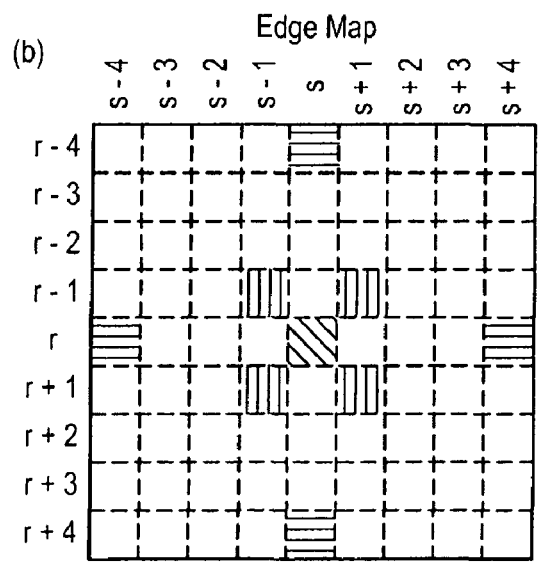
FIG. 9 shows enhancement of the edge map.

FIG. 9 shows enhancement of the edge map. In particular, FIG. 9(*a*) shows a calculation formula, and FIG. 9(*b*) conceptually shows enhancing the edge map according to the calculation formula of FIG. 9(*a*).

In FIG. 9(*a*), $c_{(r,s)}=0$ with $(c_{(r-1,s-1)}+c_{(r-1,s+1)}+c_{(r+1,s-1)}+c_{(r+1,s+1)})>2$ or $(c_{(r-4,s)}+c_{(r,s-4)}+c_{(r,s+4)}+c_{(r+4,s)})>2$ denote the binary median operation whereas $c_{(r,s)}=1$ with $(c_{(r-1,s-1)}+c_{(r-1,s+1)}+c_{(r+1,s-1)}+c_{(r+1,s+1)})=0$ constitutes a minimum filter-like morphological operation. Switching between these two filtering modes enhances the edge map as the procedure removes isolated edge pixels meaning no significant structural content and adds new edge pixels in true edge locations. In all remaining cases, the $c_{(r,s)}$ value is kept unchanged, meaning that no enhancement is necessary.

A hatched rectangle in FIG. 9(*b*) represents the position of a target binary value $c_{(r,s)}$. The edge map enhancement process first determines whether the target binary value $c_{(r,s)}$ is equal to 0, 1, or undefined. When the target binary value $c_{(r,s)}$ is equal to 0, it is next determined whether the sum of the binary values (namely $c_{(r-1,s-1)}$, $c_{(r-1,s+1)}$, $c_{(r+1,s-1)}$, and $c_{(r+1,s+1)}$) at each corner of the target binary value $c_{(r,s)}$ is greater than 2, and/or whether the sum of the four binary values (namely $c_{(r-4,s)}$, $c_{(r,s-4)}$, $c_{(r,s-4)}$, and $c_{(r+4,s)}$) of pixels above, below, to the left of, and to the right of the target binary value $c_{(r,s)}$ is greater than 2. If either/both of these conditions are true, it is determined that an edge goes through the target pixel $z_{(r,s)}$ and the target binary value $c_{(r,s)}$ is changed from 0 to 1. Vertically striped rectangles in FIG. 9(*b*) represent the positions of the binary values (namely $c_{(r-1,s-1)}$, $c_{(r-1,s+1)}$, $c_{(r+1,s-1)}$, and $c_{(r+1,s+1)}$) at each corner of the target binary value $c_{(r,s)}$, and horizontally striped rectangles in FIG. 9(*b*) represent the positions of the four binary values (namely $c_{(r-4,s)}$, $c_{(r,s-4)}$, $c_{(r,s+4)}$, and $c_{(r+4,s)}$) of pixels above, below, to the left of, and to the right of the target binary value $c_{(r,s)}$.

When the target binary value $c_{(r,s)}$ is equal to 1, it is next determined whether the sum of the binary valves (namely $c_{r-1,s-1}$, $c_{(r-1,s+1)}$, $c_{(r+1,s-1)}$, and $c_{(r+1,s+1)}$) at each corner of the target binary value $c_{(r,s)}$ is equal to 0. If this condition is true, it is determined that no edge goes through the target pixel $z_{(r,s)}$ and the target binary value $c_{(r,s)}$ is changed from 1 to 0. When the target binary value is undefined, the target binary value $c_{(r,s)}$ is left unchanged meaning no enhancement is necessary.

E. Iterative Edge Map Enhancement Process

Figure 10:
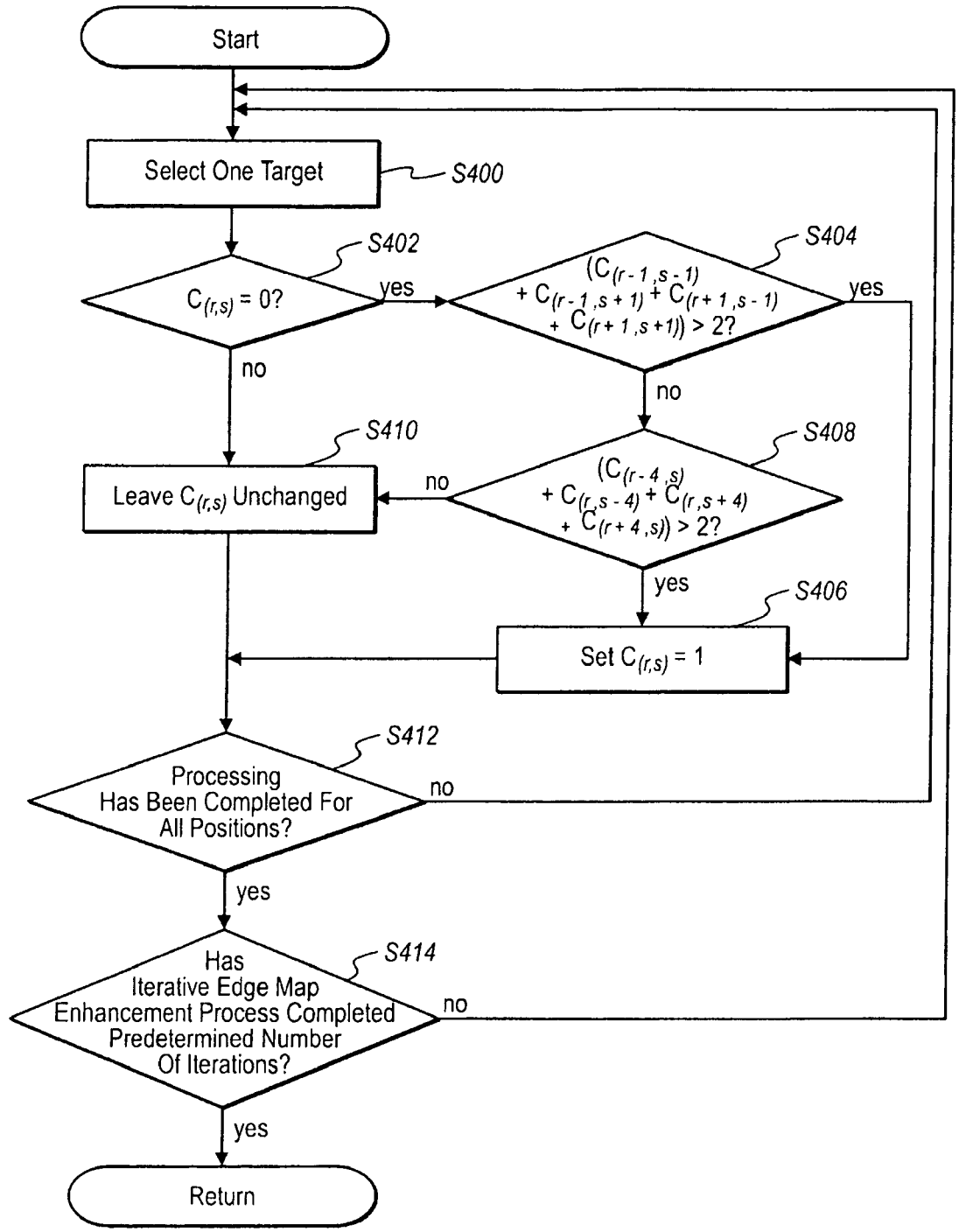
FIG. 10 is a flowchart showing the details of an iterative edge map enhancement process executed in the edge detection process of FIG. 3 by the image processing apparatus of the embodiment.

FIG. 10 is a flowchart showing the details of the iterative edge map enhancement process executed at step S108 in the edge detection process of FIG. 3 by the image processing apparatus 30 of the embodiment.

The iterative edge map enhancement process first selects one target binary value of the edge map as an object of enhancement (step S400). After selecting one target binary value, the iterative edge map enhancement process next determines whether the target value is equal to 0 (step S402).

When the target binary value is equal to 0 (step S402: yes), it is next determined whether the sum of the four binary values (namely $c_{(r-1,s-1)}$, $c_{(r-1,s+1)}$, $c_{(r+1,s-1)}$, and $c_{(r+1,s+1)}$) at each corner of the target binary value is greater than 2 (step S404). When the sum of the binary values at each corner of the target binary value is greater than 2 (step S404: yes), the target binary value is set to 1 (step S406).

When the sum of the binary values at each corner of the target binary value is not greater than 2 (step S404: no), it is next determined whether the sum of the four binary values (namely, in this embodiment, $c_{(r-4,s)}$, $c_{(r,s-4)}$, $c_{(r,s+4)}$, and $c_{(r+4,s)}$) of pixels above, below, to the left of, and to the right of the target binary value is greater than 2 (step S408). When the sum of these four binary values is greater than 2 (step S408: yes), the target binary value is set to 1 (step S406). When the sum of these four binary values is not greater than 2 (step S408: no), the target binary value is left unchanged (step S410).

When the target binary value is not equal to 0 (step S402: no), the target binary value is left unchanged meaning no enhancement is necessary (step S410).

After the value representing the edge characteristic of the target value is set equal to either 1 at step S408, or left unchanged at S410, the CPU determines whether the edges have been enhanced with regard to all the values (step S412).

When there is any unprocessed value (step S412: no), the iterative edge map enhancement process returns to step S400 to select another target value among unprocessed values and executes the subsequent series of processing.

On completion of enhancement of the edge map with regard to all the values (step S412: yes), the iterative edge map enhancement process next determines whether the iterative edge map enhancement process has completed a predetermined number of iterations (step S414). When the iterative edge map enhancement process has not completed a predetermined number of iterations (step S414: no), the iterative edge map enhancement process returns to step S400 to select a beginning target value and executes the subsequent series of processing. On completion of each of the predetermined number of iterations of the iterative edge map enhancement process (step S414: yes), the iterative edge map enhancement process of FIG. 10 is terminated.

Figure 11:
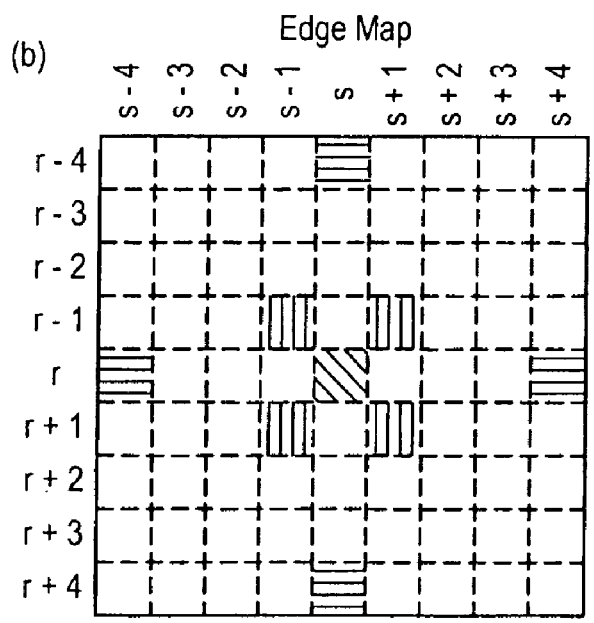
FIG. 11 shows iterative enhancement of the edge map.

FIG. 11 shows iteratively enhancing the edge map. In particular, FIG. 11($a$) shows a calculation formula, and FIG. 11($b$) conceptually shows iteratively enhancing the edge map according to the calculation formula of FIG. 11($a$). A hatched rectangle in FIG. 11($b$) represents the position of a target binary value $c_{(r,s)}$. The iterative edge map enhancement process first determines whether the target binary value $c_{(r,s)}$ is equal to 0. When the target binary value $c_{(r,s)}$ is equal to 0, it is next determined whether the sum of the binary values (namely $c_{(r-1,s-1)}$, $c_{(r-1,s+1)}$, $c_{(r+1,s-1)}$, and $c_{(r-1,s+1)}$) at each corner of the target binary value $c_{(r,s)}$ is greater than 2, and/or whether the sum of the four binary values (namely, in this embodiment, $c_{(r-4,s)}$, $c_{(r,s-4)}$, $c_{(r,s-4)}$, and $c_{(r+4,s)}$ of pixels above, below, to the left of, and to the right of the target binary value $c_{(r,s)}$ is greater than 2. If either/both of these conditions are true, it is determined that an edge goes through the target pixel $z_{(r,s)}$ and the target binary value $c_{(r,s)}$ is changed from 0 to 1. Vertically striped rectangles in FIG. 11($b$) represent the positions of the binary values (namely $c_{(r-1,s-1)}$, $c_{(r-1,s+1)}$, $c_{(r+1,s-1)}$, and $c_{(r+1,s+1)}$) at each corner of the target binary value $c_{(r,s)}$, and horizontally striped rectangles in FIG. 11($b$) represent the positions of binary values (namely, in this example embodiment, $c_{(r-4,s)}$, $c_{(r,s-4)}$, $c_{(r,s+4)}$, and $c_{(r+4,s)}$) of pixels above, below, to the left of, and to the right of the target binary value $c_{(r,s)}$.

When the target binary value $c_{(r,s)}$ is not equal to 0 (when the target binary value $c_{(r,s)}$ is equal to 1 or is undefined), the target binary value $c_{(r,s)}$ is left unchanged meaning no enhancement is necessary.

The example embodiments disclosed herein may be embodied in other specific forms. The example embodiments disclosed herein are to be considered in all respects only as illustrative and not restrictive.

What is claimed is:

1. An image processing apparatus that receives mosaic image data having settings of only one color component, among three color components R, G, and B corresponding to three primary colors of light, in each pixel and makes the received mosaic image data subject to a series of image processing to generate an edge map that identifies pixels of the mosaic image data through which an edge passes,
   where the mosaic image data is expressed by a combination of pixel columns with alternate arrangement of pixels of the G component and pixels of the R component as another color component in a vertical direction, pixel columns with alternate arrangement of pixels of the G component and pixels of the B component as another color component in the vertical direction, pixel rows with alternate arrangement of pixels of the G component and pixels of the R component as another color component in a horizontal direction, and pixel rows with alternate arrangement of pixels of the G component and pixels of the B component as another color component in the horizontal direction, the image processing apparatus comprising:
   a vertical-direction color difference component computation module configured to obtain the G component in the pixel location of another color component or to obtain another color component in the G component pixel location using vertically neighboring available components in, order to compute a vertical-direction color difference component between the G component and another color component in each pixel included in each of the pixel columns of the mosaic image;
   a horizontal-direction color difference component computation module configured to obtain the G component in the pixel location of another color component or to obtain another color component in the G component pixel location using horizontally neighboring color components in order to compute a horizontal-direction color difference component between the G component and another color component in each pixel included in each of the pixel rows of the mosaic image;
   an edge detection module configured to select pixels from the mosaic image data, and in each such pixel location compare the sign of the vertical color difference component of the target pixel to the signs of the vertical color difference components of the pixels above and below the target pixel, compare the sign of the horizontal color difference component of the target pixel to the signs of the horizontal color difference components of the pixels to the left and to the right of the target pixel, set the corresponding edge map value of the edge map to 1 where the signs in one or more of the comparisons are not equal, and set the corresponding edge map value of the edge map to 0 where the signs in all of the comparisons are equal.

2. The image processing apparatus in accordance with claim 1, further comprising an image processing module configured to employ the edge map in one of a demosaicking, resizing, denoising, or sharpening operation.

3. The image processing apparatus in accordance with claim 1, wherein the edge detection module is configured to select only the pixels of the R component and the pixels of the B component included in the mosaic image data or only the pixels of the G component.

4. The image processing apparatus in accordance with claim 3, further comprising:
   an edge map enhancement module configured to select values of the edge map, and in each such target value location, determine whether the target value is equal to 1, sum the values at each corner of the target value where the target value is equal to 1, determine whether the sum is equal to 0, and change the target value to 0 where the sum is equal to 0.

5. The image processing apparatus in accordance with claim 3, further comprising:
   an edge map enhancement module configured to select values of the edge map, and in each such target value location, determine whether the target value is equal to 0, sum the values at each corner of the target value where the target value is equal to 0, determine whether the sum is greater than 2, and change the target value to 1 where the sum is greater than 2.

6. The image processing apparatus in accordance with claim 5, wherein the edge map enhancement module is further configured to select values of the edge map, and in each such target value location, determine whether the target value is equal to 0, sum the four values of pixels above, below, to the left of, and to the right of the target value where the target value is equal to 0, determine whether the sum is greater than 2, and change the target value to 1 where the sum is greater than 2.

7. The image processing apparatus in accordance with claim 6, further comprising:
   an iterative edge map enhancement module configured to perform an iterative edge map enhancement process comprising:
   a) selecting values of the edge map, and in each such target value location, determine whether the target value is equal to 0,
   b) summing the values at each corner of the target value where the target value is equal to 0 and determine whether the sum is greater than 2 and change the target value to 1 where the sum is greater than 2;
   c) summing the four values of pixels above, below, to the left of, and to the right of the target value where the target value is equal to 0 and determine whether the sum is greater than 2 and change the target value to 1 where the sum is greater than 2;
   d) repeating a), b), and c) at least once.

8. An image processing method that receives mosaic image data having settings of only one color component, among three color components R, G, and B corresponding to three primary colors of light, in each pixel and makes the received mosaic image data subject to a series of image processing to generate an edge map that identifies pixels of the mosaic image data through which an edge passes,
   the image processing method comprising:
   receiving, as the mosaic image data, image data expressed by a combination of pixel columns with alternate arrangement of pixels of the G component and pixels of the R component as another color component in a vertical direction, pixel columns with alternate arrangement of pixels of the G component and pixels of the B component as another color component in the vertical direction, pixel rows with alternate arrangement of pixels of the G component and pixels of the R component as another color component in a horizontal direction, and pixel rows with alternate arrangement of pixels of the G component and pixels of the B component as another color component in the horizontal direction;
   obtaining the G component and another color component in each pixel included in each of the pixel columns of the mosaic image data, and computing a vertical-direction color difference component between the G component and another color component in each pixel included in each of the pixel columns in the vertical direction;
   obtaining the G component and another color component in each pixel included in each of the pixel rows of the mosaic image data, and computing a horizontal-direction color difference component between the G component and another color component in each pixel included in each of the pixel rows in the horizontal direction;
   selecting pixels from the mosaic image data, and in each such pixel location comparing the sign of the vertical color difference component of the target pixel to the signs of the vertical color difference components of the pixels above and below the target pixel, comparing the sign of the horizontal color difference component of the target pixel to the signs of the horizontal color difference components of the pixels to the left and to the right of the target pixel, setting the corresponding edge map value of the edge map to 1 where the signs in one or more of the comparisons are not equal, and setting the corresponding edge map value of the edge map to 0 where the signs in all of the comparisons are equal.

9. The image processing method in accordance with claim 8, further comprising employing the edge map in one of a demosaicking, resizing, denoising, or sharpening operation.

10. The image processing method in accordance with claim 8, wherein selecting pixels from the mosaic image data comprises selecting only the pixels of the R component and the pixels of the B component included in the mosaic image data or only the pixels of the G component.

11. The image processing method in accordance with claim 10, further comprising:
    selecting values of the edge map, and in each such target value location, determining whether the target value is equal to 1, summing the values at each corner of the target value where the target value is equal to 1, determining whether the sum is equal to 0, and changing the target value to 0 where the sum is equal to 0.

12. The image processing method in accordance with claim 10, further comprising:
    selecting values of the edge map, and in each such target value location, determining whether the target value is equal to 0, summing the values at each corner of the target value where the target value is equal to 0, determining whether the sum is greater than 2, and changing the target value to 1 where the sum is greater than 2.

13. The image processing method in accordance with claim 12, further comprising:
    selecting values of the edge map, and in each such target value location, determining whether the target value is equal to 0, summing the four values of pixels above, below, to the left of, and to the right of the target value where the target value is equal to 0, determining whether the sum is greater than 2, and changing the target value to 1 where the sum is greater than 2.

14. The image processing method in accordance with claim 13, further comprising:
    a) selecting values of the edge map, and in each such target value location, determining whether the target value is equal to 0;
    b) summing the values at each corner of the target value where the target value is equal to 0 and determining whether the sum is greater than 2 and changing the target value to 1 where the sum is greater than 2;
    c) summing the four values of pixels above, below, to the left of, and to the right of the target value where the target value is equal to 0 and determining whether the sum is greater than 2 and changing the target value to 1 where the sum is greater than 2; and
    d) repeating a), b), and c) at least once.

15. A non-transitory computer-readable medium having a program that causes a computer to actualize a method of receiving mosaic image data having settings of only one color component, among three color components R, G, and B corresponding to three primary colors of light, in each pixel and making the received mosaic image data subject to a series of image processing to generate an edge map that identifies pixels of the mosaic image data through which an edge passes,
    the program causing the computer to attain the functions of:
    receiving, as the mosaic image data, image data expressed by a combination of pixel columns with alternate arrangement of pixels of the G component and pixels of the R component as another color component in a vertical direction, pixel columns with alternate arrangement of pixels of the G component and pixels of the B component as another color component in the vertical direction, pixel rows with alternate arrangement of pixels of the G component and pixels of the R component as another color component in a horizontal direction, and pixel rows with alternate arrangement of pixels of the G component and pixels of the B component as another color component in the horizontal direction;

obtaining the G component and another color component in each pixel included in each of the pixel columns of the mosaic image data, and computing a vertical-direction color difference component between the G component and another color component in each pixel included in each of the pixel columns in the vertical direction;

obtaining the G component and another color component in each pixel included in each of the pixel rows of the mosaic image data, and computing a horizontal-direction color difference component between the G component and another color component in each pixel included in each of the pixel rows in the horizontal direction;

selecting pixels from the mosaic image data, and in each such pixel location comparing the sign of the vertical color difference component of the target pixel to the signs of the vertical color difference components of the pixels above and below the target pixel, comparing the sign of the horizontal color difference component of the target pixel to the signs of the horizontal color difference components of the pixels to the left and to the right of the target pixel, setting the corresponding edge map value of the edge map to 1 where the signs in one or more of the comparisons are not equal, and setting the corresponding edge map value of the edge map to 0 where the signs in all of the comparisons are equal.

16. The computer-readable medium in accordance with claim 15, further comprising employing the edge map in one of a demosaicking, resizing, denoising, or sharpening operation.

17. The computer-readable medium in accordance with claim 15, wherein selecting pixels from the mosaic image data comprises selecting only the pixels of the R component and the pixels of the B component included in the mosaic image data or only the pixels of the G component.

18. The computer-readable medium in accordance with claim 17, further comprising:
  selecting values of the edge map, and in each such target value location, determining whether the target value is equal to 1, summing the values at each corner of the target value where the target value is equal to 1, determining whether the sum is equal to 0, and changing the target value to 0 where the sum is equal to 0.

19. The computer-readable medium in accordance with claim 17, further comprising:
  selecting values of the edge map, and in each such target value location, determining whether the target value is equal to 0, summing the values at each corner of the target value where the target value is equal to 0, determining whether the sum is greater than 2, and changing the target value to 1 where the sum is greater than 2.

20. The computer-readable medium in accordance with claim 19, further comprising:
  selecting values of the edge map, and in each such target value location, determining whether the target value is equal to 0, summing the four values of pixels above, below, to the left of, and to the right of the target value where the target value is equal to 0, determining whether the sum is greater than 2, and changing the target value to 1 where the sum is greater than 2.

21. The computer-readable medium in accordance with claim 20, further comprising:
  a) selecting values of the edge map, and in each such target value location, determining whether the target value is equal to 0;
  b) summing the values at each corner of the target value where the target value is equal to 0 and determining whether the sum is greater than 2 and changing the target value to 1 where the sum is greater than 2;
  c) summing the four values of pixels above, below, to the left of, and to the right of the target value where the target value is equal to 0 and determining whether the sum is greater than 2 and changing the target value to 1 where the sum is greater than 2; and
  d) repeating a), b), and c) at least once.

* * * * *

UNITED STATES PATENT AND TRADEMARK OFFICE
CERTIFICATE OF CORRECTION

PATENT NO. : 8,045,826 B2  
APPLICATION NO. : 12/167949  
DATED : October 25, 2011  
INVENTOR(S) : Rastislav Lukac Page 1 of 1

It is certified that error appears in the above-identified patent and that said Letters Patent is hereby corrected as shown below:

Title page, Item (54) and Col. 1, line 1

Please change "DETECTING EDGES IN A DIGITAL IMAGES" to  
--DETECTING EDGES IN A DIGITAL IMAGE--

Signed and Sealed this  
Sixth Day of December, 2011

David J. Kappos  
*Director of the United States Patent and Trademark Office*